G. G. Heermance.
Cistern.

No. 57,322. Patented Aug. 21, 1866.

Witnesses:

Inventor:
Gaut G. Heermance

UNITED STATES PATENT OFFICE.

GARET G. HEERMANCE, OF CLAVERACK, NEW YORK.

IMPROVEMENT IN CONSTRUCTION OF WELLS.

Specification forming part of Letters Patent No. 57,322, dated August 21, 1866.

*To all whom it may concern:*

Be it known that I, GARET G. HEERMANCE, of the town of Claverack, in the county of Columbia and State of New York, have invented a new and Improved Mode of Constructing Wells for procuring water or oil from beneath the surface of the earth; and I do hereby declare that the following is a full, clear, and exact description of the same, reference being had to the annexed drawings, making a part of this specification, in which—

Figure 4:
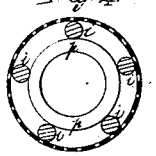
Figure 1:
Figure 2:
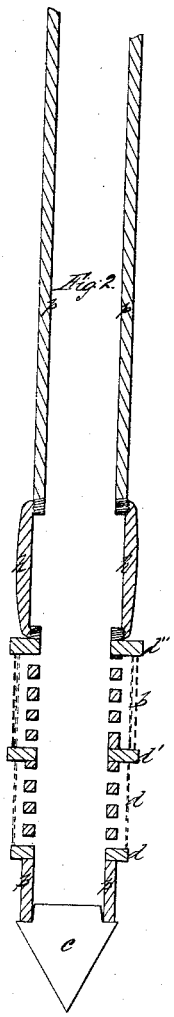
Figure 3:
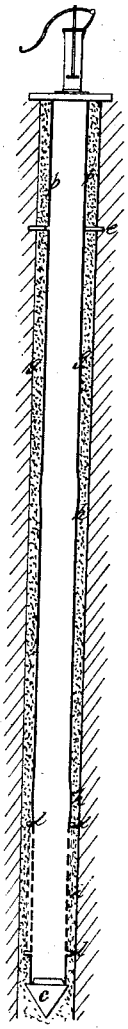

Figure 1 is a perspective view; Fig. 2, a longitudinal section; Fig. 3, a vertical section of the well completed; Fig. 4, a transverse section of strainer.

The nature of my invention consists, first, in cutting off the surface-water from the interior of the discharging-tube by means of a partition, as at $e$; second, in filling the space outside of the discharging-tube with a filtering material, so that the water or oil between the partition $e$ and the point $c$ shall be filtered before it enters the discharging-pipe, and also so that the sides of the well may be sustained by the material or means used for filtering the fluids; third, in making the strainer-section of the pipe with horizontal shoulder-collars $d$ $d''$ and vertical ribs $i\ i$, so that the straining material may be placed and sustained outside of the said perforated strainer-section of the pipe, and be protected from contact with substances which would injure it in its descent by means of the shoulder-collars and ribs, and so that the water shall flow more freely; fourth, in the combination of the filtering material, placed in a hole of larger diameter than the pipe, the collar $e$, the strainer-section, constructed as specified, and the removable conical point, whereby water or oil may be raised from below the surface of the earth in a very pure and clean condition, and the apparatus can be kept continually in a condition for operation by a very little care and attention bestowed upon it.

To enable those skilled in the art to make and use my invention, I will proceed to describe its construction and operation.

In clay earth I bore a hole with an instrument similar to a post-auger, with a cylindrical or solid iron shaft of sufficient size and strength, composed of several lengths or sections so constructed as to be screwed or otherwise connected together as the depth of the hole increases, and where water is found in sufficient quantity I insert the pipe provided with the strainer, as hereinafter described. (See Fig. 3.) Around the outside of the pipe or tube, which is usually about one and one-half inch in diameter, I fill the hole with coarse sand or gravel or other filtering material, $g\ g$. The pipe being thus inserted, the water or oil enters it through the strainer $a$ and rises to a height proportionate to the supply. Within three or four feet of the surface of the ground I place on the pipe a collar, $e$, which extends beyond the edge of hole. In loam and sand earth I drive down pointed bars of iron, adding section to section until the water or oil is found. The hole is in this as in the clay earth made larger than the tube to be inserted, so as to allow filling in around it gravel or other filtering material, or with another pipe perforated for a curb or wall.

For elevating the water or oil, I use iron pipe or tubing of from one to two inches in diameter, or larger if required. The lower extremity of the lower or first section of this pipe is perforated with holes one-quarter of an inch or more in diameter, about a quarter of an inch apart, for a distance of one and a half to two feet, commencing six inches or more above the lower end. The inside of the lower portion of this pipe, after being perforated, as above described, is bored out, and smoothed and straightened, if crooked, so as to allow the use of a sand-pump within to clean it out when necessary. On the outside of the pipe, where the perforations are made, I solder on several ribs or ridges, (see Fig. 4,) around and upon which I wrap closely and solder fast or otherwise attach a finely-perforated metallic case, $a$, or fine wire-cloth.

I sometimes employ a double casing or strainer, $b$, over the perforations in the pipe, composed of fine wire-cloth, covered and protected by a perforated metallic case. These casings or strainers are kept from an eighth to a quarter of an inch distant from the iron pipe by means of the ribs $i\ i\ i$, &c., Fig. 4, thus forming chambers between them and the perforated pipe. These, $a$ and $b$, are also securely kept in place by the metallic rings $d\ d'\ d''$.

In the lower extremity or bottom of the pipe I insert a conical or pointed plug, $c$, shouldered and wedging upward in the pipe, so that it may be forced out by the use of an iron rod inserted in the top of the pipe whenever the lower end becomes filled up with sand or dirt, so as to obstruct the inward flow of the water, or it becomes filthy and impure. By forcing this plug out into the ground below, the sand and dirt that may have accumulated within passes out with it, and the space is then filled with coarse gravel or pebbles by dropping them in at top, and these, on becoming foul, are also forced down into the earth beneath and replaced by clean, in the same manner as before. If necessary, I attach a common suction-pump to the top of the pipe, Fig. 3, to draw the water when the depth does not exceed thirty feet.

The strainers $a$ or $b$ may also be placed inside the iron pipe, instead of outside. Although two kinds of strainers are shown on the drawings annexed, (see Figs. 2 and 3,) yet I employ only one in a place.

Woolen cloths or other materials not metallic may be used for the strainer.

The ordinary screw-coupling $h$ I commonly employ for uniting the different lengths of pipe.

When the well is sunk a greater depth than thirty feet the water or oil must be elevated by the ordinary lifting-pumps.

I do not claim as new drilling or boring a small deep hole in the earth with or by means of a perforated pipe with a pointed end, constructed as a drill, for procuring water or oil; nor do I claim inserting a perforated pipe with pointed end, constructed as a drill, in this hole, for collecting or elevating the water or oil, nor yet attaching a pump to the top of the perforated tube or pipe for elevating the same; but

What I claim as my invention, and desire to secure by Letters Patent of the United States, is—

1. The manner of constructing the well or hole, as set forth.

2. The construction of the strainer-section with horizontal shoulder-collars $d\ d''$ and vertical ribs or strips $i\ i$, the said strainer-section having the wire-gauze or other finely perforated material placed outside of the pipe and above the sand-chamber thereof, substantially as described.

3. The collars $d\ d''$ or $d\ d'\ d''$ on the strainer-section, substantially as and for the purpose described.

4. Trapping the water by the partition $e$, filtering it in its descent by the material $g\ g$, and discharging it through the pipe after it has entered through a strainer-section which is near the lower end of said pipe, substantially as described.

5. The collar $e$, in combination with an apparatus such as herein described, for the purpose set forth.

GARET G. HEERMANCE.

Witnesses:
   ALEX. S. ROWLEY,
   OBADIAH WILCOX.